United States Patent
Park et al.

(10) Patent No.: US 11,251,708 B2
(45) Date of Patent: Feb. 15, 2022

(54) INVERTING SWITCHING REGULATOR USING CHARGE PUMP AND OPERATING METHOD THEREOF

(71) Applicant: SAMSUNG ELECTRONICS CO., LTD., Suwon-si (KR)

(72) Inventors: Seungchan Park, Incheon (KR); Jongbeom Baek, Yangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 16/788,731

(22) Filed: Feb. 12, 2020

(65) Prior Publication Data

US 2021/0050786 A1 Feb. 18, 2021

(30) Foreign Application Priority Data

Aug. 16, 2019 (KR) .................. 10-2019-0100532

(51) Int. Cl.
*H02M 3/07* (2006.01)
*H02M 3/158* (2006.01)
*H02M 1/00* (2006.01)

(52) U.S. Cl.
CPC .......... *H02M 3/1582* (2013.01); *H02M 3/07* (2013.01); *H02M 1/0095* (2021.05); *H02M 3/071* (2021.05)

(58) Field of Classification Search
CPC ... H02M 3/1582; H02M 1/0095; H02M 3/071
See application file for complete search history.

(56) References Cited

U.S. PATENT DOCUMENTS

| | | |
|---|---|---|
| 7,973,494 B2 | 7/2011 | Yao et al. |
| 8,368,365 B2 | 2/2013 | Canfield et al. |
| 9,136,756 B2 | 9/2015 | Liu |
| 9,571,006 B2 | 2/2017 | Stahl et al. |
| 9,595,871 B1 | 3/2017 | Bayer et al. |
| 9,859,801 B2 | 1/2018 | Wangemann et al. |
| 9,997,996 B1 | 6/2018 | Halberstadt |

(Continued)

FOREIGN PATENT DOCUMENTS

DE  10 2018 222 905 A1  7/2020

OTHER PUBLICATIONS

B. Bryant and M. K. Kazimierezuk, "Derivation of the buck-boost PWM DC-DC converter circuit topology," 2002 IEEE International Symposium on Circuits and Systems (ISCAS), 2002, pp. V-V, doi: 10.1109/ISCAS.2002.1010835. (Year: 2002).*

(Continued)

*Primary Examiner* — Peter M Novak
(74) *Attorney, Agent, or Firm* — Sughrue Mion, PLLC

(57) ABSTRACT

An inverting switching regulator is provided. The inverting switching regulator is used to generate a negative output voltage based on a positive input voltage. The inverting switching regulator includes an inductor configured to pass an inductor current from a first terminal to a second terminal; a flying capacitor coupled to the second terminal of the inductor; and a plurality of switches configured to apply a negative voltage to the second terminal of the inductor by charging the flying capacitor by the positive input voltage during a first phase, and by connecting the flying capacitor in series to a ground node and the inductor during a second phase.

12 Claims, 15 Drawing Sheets

(56) References Cited

U.S. PATENT DOCUMENTS

| | | |
|---|---|---|
| 10,014,778 B1 | 7/2018 | Wei et al. |
| 10,910,947 B2 | 2/2021 | Cavallini et al. |
| 2010/0039080 A1* | 2/2010 | Schoenbauer ...... H02M 3/1582 |
| | | 323/234 |
| 2013/0038305 A1 | 2/2013 | Arno et al. |
| 2014/0354349 A1* | 12/2014 | Liu .................... H02M 3/1588 |
| | | 327/536 |
| 2017/0163157 A1 | 6/2017 | Petersen |
| 2017/0279354 A1* | 9/2017 | Lueders ................ H02M 3/158 |
| 2019/0052173 A1 | 2/2019 | Shumkov et al. |

OTHER PUBLICATIONS

Communication dated Nov. 10, 2021, issued by the German Patent Office in German Application No. 102020107401.8.

* cited by examiner

INVERTING SWITCHING REGULATOR USING CHARGE PUMP AND OPERATING METHOD THEREOF

CROSS-REFERENCE TO THE RELATED APPLICATION

This application claims priority from Korean Patent Application No. 10-2019-0100532, filed on Aug. 16, 2019 in the Korean Intellectual Property Office, the disclosure of which is incorporated herein by reference in its entirety.

BACKGROUND

1. Field

Devices and methods consistent with embodiments relate to generation of a negative supply voltage, and more specifically, to an inverting switching regulator using a charge pump and an operating method thereof.

2. Related Art

A supply voltage may be generated to provide power to electronic parts, or loads. A switching regulator for generating the supply voltage from an input voltage provided by a battery may be used. In addition, some loads require a negative supply voltage as well as a positive supply voltage. Therefore, an inverting switching regulator for generating the negative supply voltage from a positive input voltage may be used. When a large voltage swing is generated by the inverting switching regulator, devices having large breakdown voltages may be required. However, such devices may have low efficiency due to high parasitic components, may occupy large areas, and may not be easily integrated in the same integrated circuit together with other devices.

SUMMARY

One or more embodiments provide an inverting switching regulator including devices having high efficiency due to low voltage swing and a method of operating the same.

According to an aspect of an embodiment, there is provided an inverting switching regulator for generating a negative output voltage based on a positive input voltage. The inverting switching regulator includes an inductor configured to pass an inductor current from a first terminal to a second terminal; a flying capacitor coupled to the second terminal of the inductor; and a plurality of switches. The switches are configured to apply a negative voltage to the second terminal of the inductor by charging the flying capacitor by the positive input voltage during a first phase, and by connecting the flying capacitor in series to a ground node and the inductor during a second phase.

According to an aspect of an embodiment, there is provided an inverting switching regulator for generating a negative output voltage based on a positive input voltage. The inverting switching regulator includes an inductor configured to pass an inductor current from a first terminal of the inductor to a second terminal of the inductor; and a flying capacitor. The flying capacitor is configured to be charged by the positive input voltage during a first phase and to cause a negative voltage in the second terminal of the inductor in accordance with stored charges during a second phase. The inductor current flows to a ground node during the first phase and flows to the flying capacitor during the second phase.

According to an aspect of an embodiment, there is provided a method of providing a negative output voltage based on a positive input voltage. The method includes charging a flying capacitor by the positive input voltage during a first phase. The method includes steering an inductor current to sequentially flow through a first terminal and a second terminal of an inductor to a ground node during the first phase. The method includes applying a negative voltage to the second terminal of the inductor in accordance with stored charges of the flying capacitor during a second phase. The method includes steering the inductor current to sequentially flow through the first terminal and the second terminal of the inductor to the flying capacitor during the second phase.

BRIEF DESCRIPTION OF THE DRAWINGS

Embodiments will be more clearly understood from the following detailed description taken in conjunction with the accompanying drawings.

DETAILED DESCRIPTION

Figure 1:
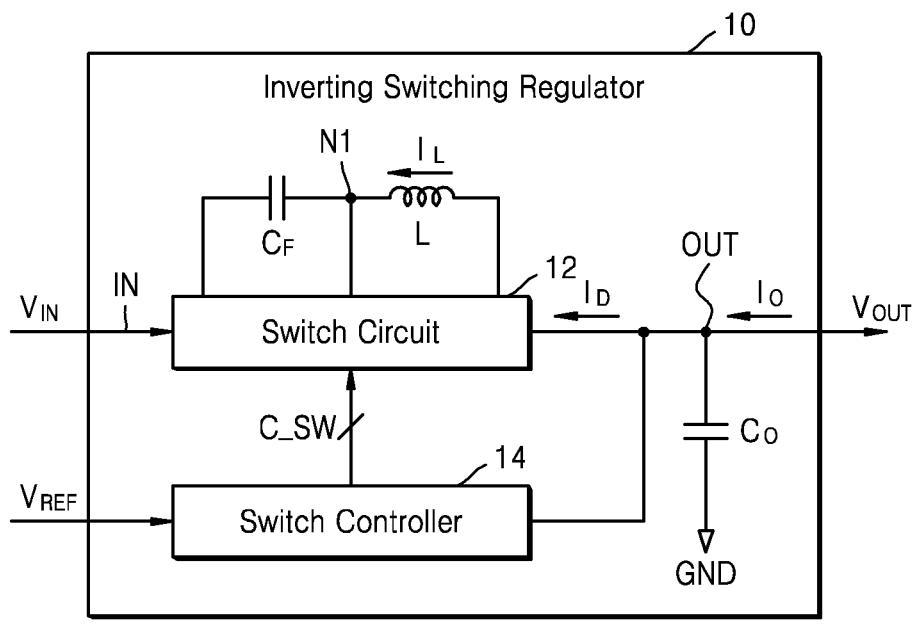
FIG. 1 is a block diagram illustrating an inverting switching regulator according to an embodiment.

FIG. 1 is a block diagram illustrating an inverting switching regulator 10 according to an embodiment. The inverting switching regulator 10 may receive a input voltage $V_{IN}$ that is a positive voltage through an input node IN and may output a output voltage $V_{OUT}$ that is a negative voltage through an output node OUT. The output voltage $V_{OUT}$ may be used as a supply voltage of other electronic parts, or loads. As illustrated in FIG. 1, the inverting switching regulator 10 may include a switch circuit 12, a switch controller 14, a flying capacitor $C_F$, an inductor L, and an output capacitor $C_O$. In some embodiments, two or more of the components included in the inverting switching regulator 10 may be included in one package. For example, the switch circuit 12 and the switch controller 14 may be integrated in one die and may be included in the same semiconductor package. In some embodiments, the inverting switching regulator 10 may include a printed circuit board (PCB) and at least two of the components of the inverting switching regulator 10 may be mounted in the PCB as separate packages.

The inverting switching regulator 10 may refer to an electronic circuit for generating the output voltage $V_{OUT}$ by switching a device on/off. For example, the switch circuit 12 of the inverting switching regulator 10 may include a plurality of switches and at least one switch included in the switch circuit 12 may be turned on/off in accordance with a switch control signal C_SW provided by the switch controller 14. Therefore, a path of an inductor current $I_L$ that passes through the inductor L may be steered so that the output voltage $V_{OUT}$ is generated. Herein, a switch may be referred to as being in an on state when both ends of the switch are electrically connected each other, and a switch may be referred to as being in an off state when both ends of the switch are electrically disconnected (e.g., isolated) from each other. In addition, two or more components electrically connected through the switch in the on state may be referred to as being connected and two or more components always electrically connected through a conducting wire may be referred to as being coupled.

As described later as an example of the inverting switching regulator 10 with reference to FIG. 2, an inverting direct current (DC)-DC converter may generate a negative output voltage $V_{OUT}$ based on a positive input voltage $V_{IN}$. For example, an inverting buck converter may generate the output voltage $V_{OUT}$ higher than an inverted version of the input voltage $V_{IN}$ ($-V_{IN} \leq V_{OUT} \leq 0$). An inverting boost converter may generate the output voltage $V_{OUT}$ lower than the inverted version of the input voltage $V_{IN}$ ($V_{OUT} \leq -V_{IN} \leq 0$). An inverting buck-boost converter may generate the output voltage $V_{OUT}$ lower or higher than the inverted version of the input voltage $V_{IN}$. In some embodiments, the inverting buck-boost converter may be set to one of an inverting buck mode ($-V_{IN} < V_{OUT} < 0$) in which the output voltage $V_{OUT}$ higher than the inverted version of the input voltage $V_{IN}$ is generated, an inverting boost mode ($V_{OUT} < -V_{IN} < 0$) in which the output voltage $V_{OUT}$ lower than the inverted version of the input voltage $V_{IN}$ is generated, and an inverting buck-boost mode ($-V_{IN} \approx V_{OUT}$) in which the output voltage $V_{OUT}$ having similar level to the inverted version of the input voltage $V_{IN}$ is generated. Herein, the inverting buck converter, the inverting boost converter, and the inverting buck-boost converter may be referred to as a buck converter, a boost converter, and a buck-boost converter, respectively, and the inverting buck mode, the inverting boost mode, and the inverting buck-boost mode may also be referred to as a buck mode, a boost mode, and a buck-boost mode, respectively. Hereinafter, the inverting switching regulator 10 will be described mainly with reference to a DC-DC converter. However, it will be understood that embodiments may also be applied to another kind of inverting switching regulator such as an inverting alternate current (AC)-DC converter.

The switch circuit 12 may receive the switch control signal C_SW from the switch controller 14. The switch circuit 12 may include at least one switch that is turned on/off in accordance with the switch control signal C_SW. Each of the switches included in the switch circuit 12 may have a structure in which both ends are electrically connected or disconnected in accordance with the switch control signal C_SW provided by the switch controller 14. In some embodiments, the switch may include an n-channel field effect transistor (NFET) or a p-channel field effect transistor (PFET) having a gate which receives the switch control signal C_SW. In some embodiments, the switch may include at least one NFET and/or at least one PFET that are coupled in series or coupled in parallel. In addition, in some embodiments, the switch may include at least one different type of transistor such as a bipolar junction transistor (BJT).

In some embodiments, in accordance with the switch control signal C_SW, the switch circuit 12 may form a first circuit in a first phase P1 and a second circuit in a second phase P2. The first circuit may include the flying capacitor $C_F$, the inductor L, and the output capacitor $C_O$. The second circuit may include including the flying capacitor $C_F$, the inductor L, and the output capacitor $C_O$ For example, the first circuit may charge the flying capacitor $C_F$ by the input voltage $V_{IN}$ and may allow the inductor current $I_L$ to flow to a ground node GND. In the second circuit, the flying capacitor $C_F$ may be connected in series to the ground node GND and the inductor L, which may generate a negative voltage at a first node N1, to which the flying capacitor $C_F$ and the inductor L are connected, in accordance with charges stored in the flying capacitor $C_F$, and may allow the inductor current $I_L$ to flow to the flying capacitor $C_F$. In nodes of the first and second circuits, voltage swing may be limited. Therefore, the switch circuit 12 may include devices having a low breakdown voltage, high efficiency, and a reduced area, for example, transistors manufactured by a complementary metal oxide semiconductor (CMOS) process. As illustrated in FIG. 1, a positive output delivery current $I_D$ may flow from the output node OUT to the switch circuit 12 and accordingly, the output voltage $V_{OUT}$ may be generated in the output node OUT. Examples of the switch circuit 12 will be described later with reference to FIGS. 2, 5, and 9.

As illustrated in FIG. 1, the flying capacitor $C_F$ and the inductor L may be coupled at the first node N1. In the first circuit, the first node N1 may be connected to the ground node GND so that the flying capacitor $C_F$ is charged by the input voltage $V_{IN}$ and the inductor current $I_L$ flows to the ground node GND. On the other hand, in the second circuit, the first node N1 may be disconnected from the ground node GND so that the first node N1 has the negative voltage $-V_{IN}$ in accordance with the charges stored in the flying capacitor $C_F$ in the second circuit. The output capacitor $C_O$ may be coupled to the output node OUT and the ground node GND and may be charged or discharged so that the output voltage $V_{OUT}$ may be maintained constant. In some embodiments, the capacitance of the flying capacitor $C_F$, the inductance of the inductor L, and the capacitance of the output capacitor $C_O$ may be determined based on the input voltage $V_{IN}$, the output voltage $V_{OUT}$, a switching frequency, and/or a load current $I_O$. In addition, in some embodiments, the flying capacitor $C_F$, the inductor L, and/or the output capacitor $C_O$ may be discrete devices.

The switch controller 14 may generate the switch control signal C_SW based on a reference voltage $V_{REF}$ and the output voltage $V_{OUT}$. For example, the switch controller 14 may generate a feedback voltage based on the output voltage $V_{OUT}$ and may generate the switch control signal C_SW to control the feedback voltage to be equal to the reference voltage $V_{REF}$ by comparing the feedback voltage with the reference voltage $V_{REF}$. Therefore, a level of the output voltage $V_{OUT}$ may be determined by a level of the reference voltage $V_{REF}$ and the level of the output voltage $V_{OUT}$ may be changed by changing the level of the reference voltage $V_{REF}$. In some embodiments, the switch controller 14 may sense one or more currents, for example, the inductor current $I_L$, the output delivery current $I_D$, and the load current $I_O$, and may generate the switch control signal C_SW based on a magnitude of the sensed current. In some embodiments, the switch controller 14 may include at least one comparator and at least one logic gate.

In some embodiments, the inverting switching regulator 10 may be set to one of the buck mode, the buck-boost mode, and the boost mode in accordance with a target level of the output voltage $V_{OUT}$. For example, the switch controller 14 may set the mode of the inverting switching regulator 10 based on the input voltage $V_{IN}$ and the reference voltage $V_{REF}$, and may generate the switch control signal C_SW in accordance with the set mode. In some embodiments, the switch controller 14 may set the inverting switching regulator 10 to the buck mode when the target level of the output voltage $V_{OUT}$ is higher than about 90% of a negative voltage $-V_{INT}$ obtained by inverting the input voltage $V_{IN}$, may set the inverting switching regulator 10 to the boost mode when the target level of the output voltage $V_{OUT}$ is lower than about 110% of the negative voltage $-V_{IN}$ obtained by inverting the input voltage $V_{IN}$, and may set the inverting switching regulator 10 to the buck-boost mode when the target level of the output voltage $V_{OUT}$ is no more than about 90% and no less than about 110% of the negative voltage $-V_{IN}$ obtained by inverting the input voltage $V_{IN}$.

The switch controller 14 may generate the switch control signal C_SW so that the flying capacitor $C_F$ and the switch circuit 12 function as a charge pump that generates the negative voltage and may apply the negative voltage generated by the charge pump to the inductor L when some phases included in a switching cycle starts. In some embodiments, the negative voltage applied to the inductor L may correspond to the negative voltage $-V_{IN}$ obtained by inverting the input voltage $V_{IN}$. Therefore, a voltage applied to both ends of each of the devices, that is, the switches included in the switch circuit 12, may be limited. As a result, the inverting switching regulator 10 may include devices having high efficiency.

The output voltage $V_{OUT}$ generated by the inverting switching regulator 10 may function as the supply voltage for providing power to electronic components. The electronic components may be referred to as a load of the inverting switching regulator 10. For example, the output voltage $V_{OUT}$ may be provided to a digital circuit for processing a digital signal, an analog circuit for processing an analog signal, and/or a radio frequency (RF) circuit for processing an RF signal.

Figure 2:
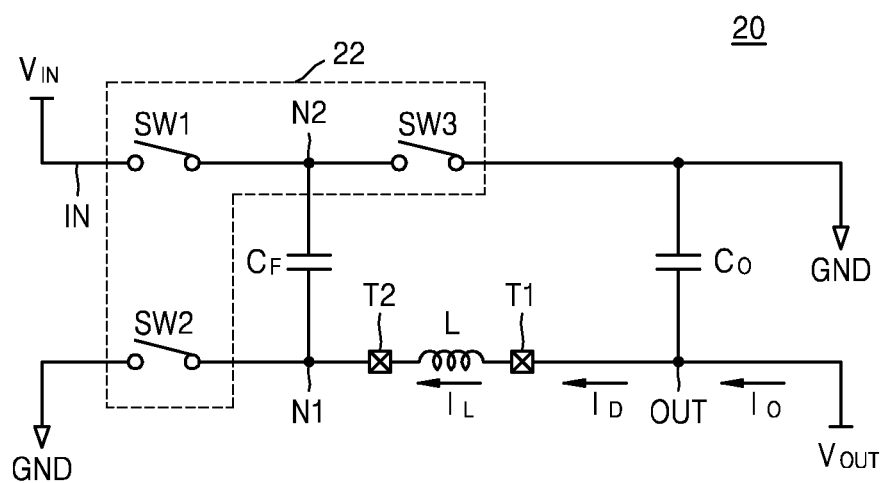
FIG. 2 is a circuit diagram of an inverting switching regulator according to an embodiment.

FIG. 2 is a circuit diagram of an inverting switching regulator 20 according to an embodiment. In detail, the circuit diagram of FIG. 2 illustrates the inverting switching regulator 20 that functions as the inverting buck converter. As described above with reference to FIG. 1, the inverting switching regulator 20 may include a switch circuit 22, the flying capacitor $C_F$, the inductor L, and the output capacitor $C_O$.

The switch circuit 22 may include first, second, and third switches SW1, SW2, and SW3. As illustrated in FIG. 2, the first switch SW1 may be coupled to the input node IN and a second node N2, the second switch SW2 may be coupled to the ground node GND and the first node N1, and the third switch SW3 may be coupled to the second node N2 and the ground node GND. As described above with reference to FIG. 1, the first, second, and third switches SW1, SW2, and SW3 may be turned on or off based on the switch control signal C_SW provided by the switch controller 14.

The flying capacitor $C_F$ may be coupled to the second switch SW2 and the inductor L at the first node N1 and may be coupled to the first and third switches SW1 and SW3 at the second node N2. As described later with reference to FIG. 3A, when the first and second switches SW1 and SW2 are turned on and the third switch SW3 is turned off, the flying capacitor $C_F$ may be charged by the input voltage $V_{IN}$. On the other hand, as described later with reference to FIG. 3B, when the first and second switches SW1 and SW2 are turned off and the third switch SW3 is turned on, the flying capacitor $C_F$ may generate the negative voltage at the first node N1.

The inductor L may have a first terminal T1 coupled to the output node OUT and a second terminal T2 coupled to the first node N1, and the inductor current $I_L$ may flow from the first terminal T1 to the second terminal T2. The inductor L is coupled to the output node OUT and accordingly, as illustrated in FIG. 2, the output delivery current $I_D$ may be equal to the inductor current $I_L$ ($I_L=I_D$). As described later with reference to FIG. 3A, when the second switch SW2 is turned on, the inductor current $I_L$ may flow to the ground node GND. On the other hand, as described later with reference to FIG. 3B, when the second switch SW2 is turned off, the inductor current $I_L$ may flow to the flying capacitor $C_F$.

The output capacitor $C_O$ may be coupled to the inductor L at the output node OUT and may be coupled to the ground node GND. Therefore, the output capacitor $C_O$ may receive a part of the load current $I_O$ or may provide a part of the output delivery current $I_D$.

Figure 3A:
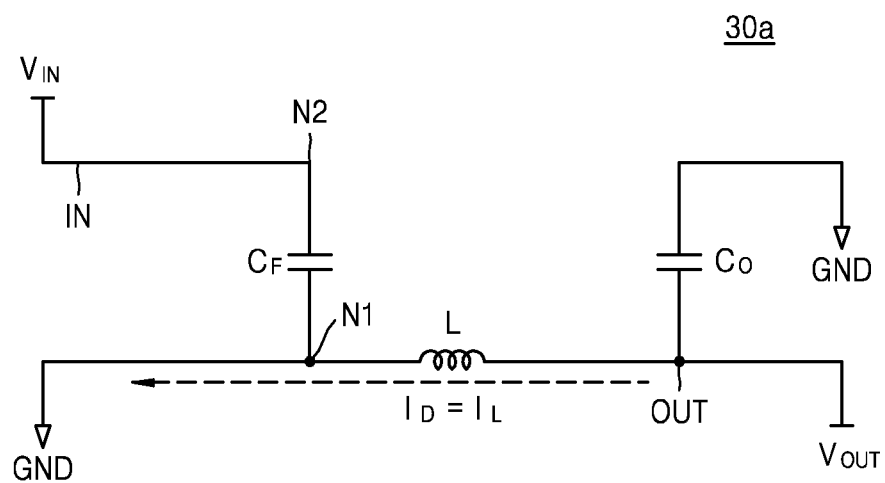
FIGS. 3A and 3B are circuit diagrams illustrating equivalent circuits of the inverting switching regulator of FIG. 2 according to embodiments.
Figure 3B:
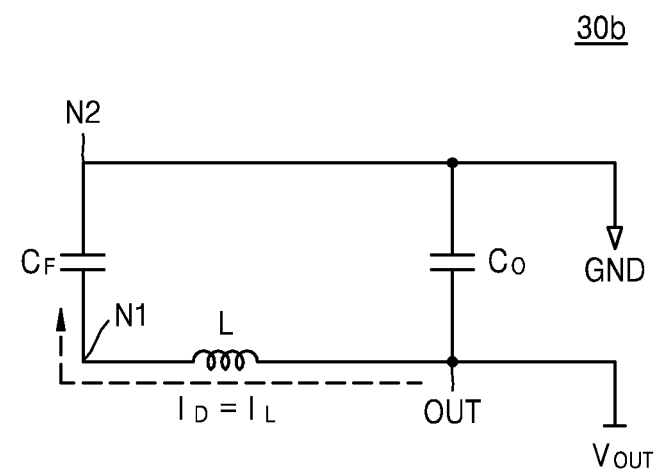
Figure 4:
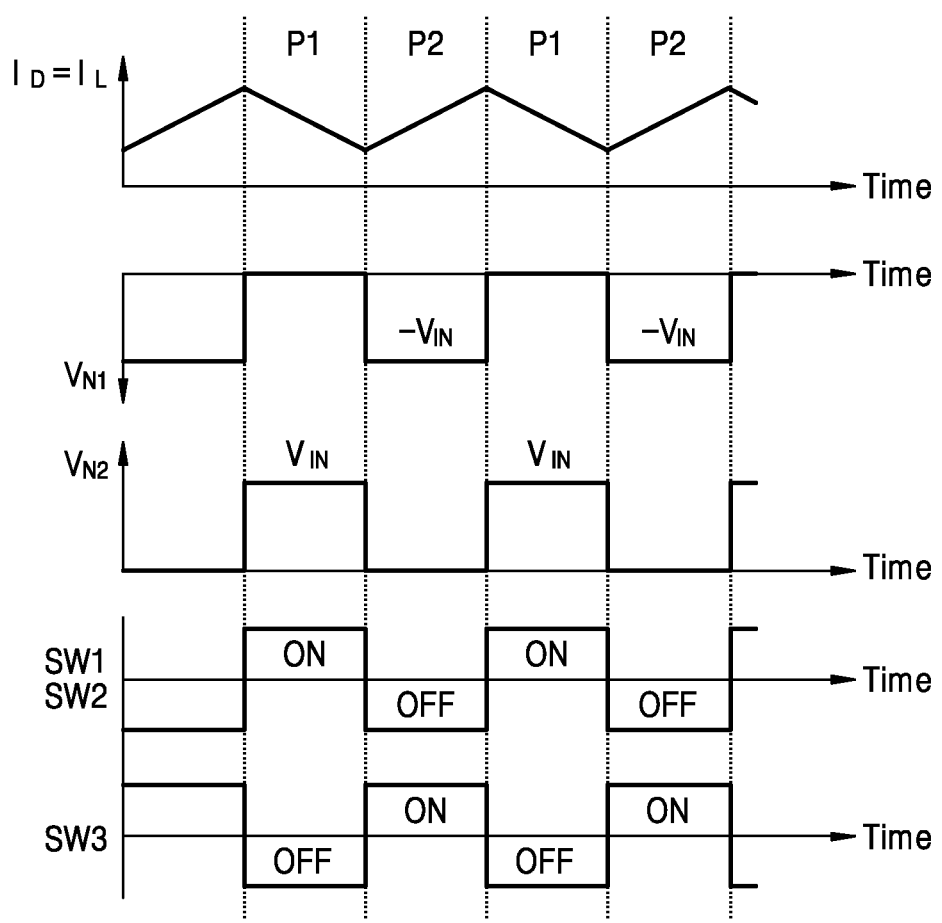
FIG. 4 is a timing diagram illustrating an example of an operation of the inverting switching regulator of FIG. 2 according to an embodiment.

FIGS. 3A and 3B are circuit diagrams illustrating equivalent circuits of the inverting switching regulator 20 of FIG. 2 according to embodiments. FIG. 4 is a timing diagram illustrating an example of an operation of the inverting switching regulator 20 of FIG. 2 according to an embodiment. In detail, the circuit diagram of FIG. 3A illustrates an equivalent circuit 30a of the inverting switching regulator 20 and a path of the inductor current $I_L$ during the first phase P1, and the circuit diagram of FIG. 3B illustrates an equivalent circuit 30b of the inverting switching regulator 20 and the path of the inductor current $I_L$ during the second phase P2. In the drawings included herein, durations of phases included in the switching cycle are illustrated as being the same for convenience. However, embodiments are not limited thereto, and durations of the phases may be different from each other according to one or more embodiments. Hereinafter, FIGS. 3A, 3B, and 4 will be described with reference to FIG. 2.

Referring to FIGS. 3A and 4, during the first phase P1, the first and second switches SW1 and SW2 may be turned on and the third switch SW3 may be turned off to form the equivalent circuit 30a of FIG. 3A. As illustrated in FIG. 4, during the first phase P1, a voltage $V_{N2}$ of the second node N2 may be equal to the input voltage $V_{IN}$ and a voltage $V_{N1}$ of the first node N1 may be equal to ground potential. Therefore, the input voltage $V_{IN}$ may be applied to the flying capacitor $C_F$ and the flying capacitor $C_F$ may be charged by the input voltage $V_{IN}$. In addition, as illustrated in FIG. 3A, the inductor current $I_L$ may flow from the output node OUT to the ground node GND through the inductor L. Therefore, as illustrated in FIG. 4, the inductor current $I_L$ may gradually reduce due to the ground potential.

Referring to FIGS. 3B and 4, during the second phase P2, the first and second switches SW1 and SW2 may be turned off and the third switch SW3 may be turned on and accordingly, the equivalent circuit 30b of FIG. 3B may be formed. As illustrated in FIG. 4, during the second phase P2, the voltage $V_{N2}$ of the second node N2 may be equal to the ground potential and, when the second phase P2 starts, the voltage $V_{N1}$ of the first node N1 may be equal to the voltage $-V_{IN}$ obtained by inverting the input voltage $V_{IN}$. Therefore, when the second phase P2 starts, the negative voltage $-V_{IN}$ may be applied to the second terminal T2 of the inductor L. In addition, as illustrated in FIG. 3B, the inductor current $I_L$ may flow from the output node OUT to the flying capacitor $C_F$ through the inductor L. Therefore, as illustrated in FIG. 4, the inductor current $I_L$ may gradually increase due to the negative voltage $-V_{IN}$. According to some embodiments, during the second phase P2, the voltage $V_{N1}$ of the first node N1 may gradually increase due to the inductor current $I_L$.

Assuming a structure of the inverting switching regulator 20 in which one terminal of the inductor L is coupled to the ground node GND and the other terminal of the inductor L is alternately connected to the input node IN and the output node OUT, the output delivery current $I_D$ may be discontinuous between a phase in which the inductor L is connected to the input node IN and a phase in which the inductor L is connected to the output node OUT. The discontinuous output delivery current $I_D$ may cause a large ripple in the output voltage $V_{OUT}$. As a result, the discontinuous output delivery current $I_D$ may prevent a desirable output voltage $V_{OUT}$ from being generated. In addition, the node coupled to the inductor L may undergo a large voltage swing because the input voltage $V_{IN}$ which is a positive voltage and the output voltage $V_{OUT}$ which is a negative voltage are alternately applied. Therefore, devices coupled to the corresponding node may have a large breakdown voltage, low efficiency, and a large area. On the other hand, as described above with reference to FIGS. 3A, 3B, and 4, in the inverting switching regulator 20 of FIG. 2, during the second phase P2, the negative voltage $-V_{IN}$ may be generated in the second terminal T2 of the inductor L and accordingly, the inductor current $I_L$ may continuously drive the output delivery current $I_D$. Therefore, as illustrated in FIG. 4, the output delivery current $I_D$ that is equal to the inductor current $I_L$ may be continuous throughout the first phase P1 and the second phase P2. As a result, the output voltage $V_{OUT}$ may have a reduced ripple. The reduced ripple may allow a small inductor L and a small output capacitor $C_O$ to be used. In addition, a voltage applied to the devices included in the inverting switching regulator 20 may be limited. For example, a voltage greater than $|V_{IN}|$ or $|V_{OUT}|$ may not be applied across any devices included in the inverting switching regulator 20 throughout the first phase P1 and the second phase P2.

Figure 5:
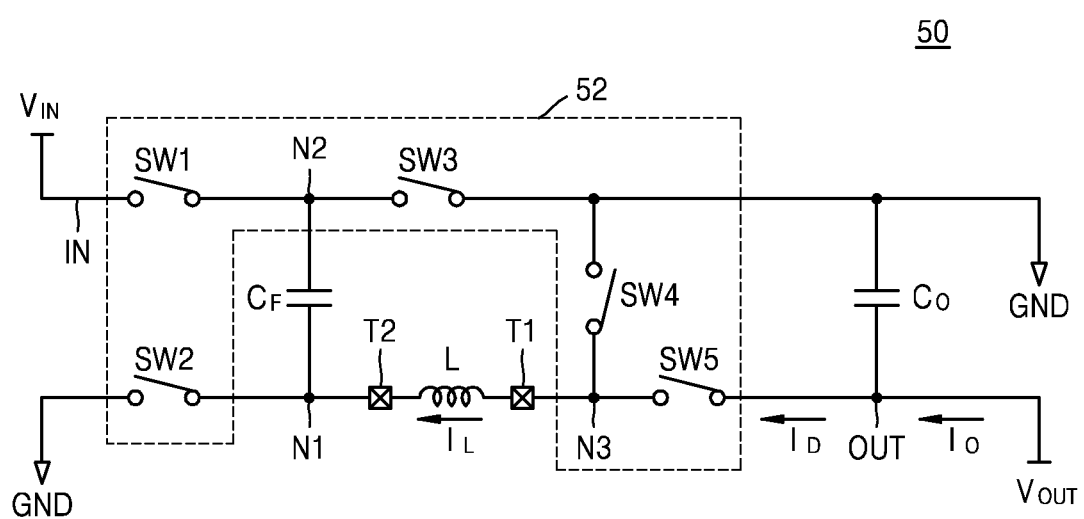
FIG. 5 is a circuit diagram of an inverting switching regulator according to an embodiment.

FIG. 5 is a circuit diagram of an inverting switching regulator 50 according to an embodiment. In detail, the circuit diagram of FIG. 5 illustrates the inverting switching regulator 50 that functions as the inverting buck-boost converter. The inverting switching regulator 50 may be set to the buck mode as described later with reference to FIG. 6 or may be set to the boost mode as described later with reference to FIG. 8. As described above with reference to FIG. 1, the inverting switching regulator 50 may include a switch circuit 52, the flying capacitor $C_F$, the inductor L, and the output capacitor $C_O$.

The switch circuit 52 may include first, second, third, fourth, and fifth switches SW1, SW2, SW3, SW4, and SW5. Like in the inverting switching regulator 20 of FIG. 2, the first switch SW1 may be coupled to the input node IN and the second node N2, the second switch SW2 may be coupled to the ground node GND and the first node N1, and the third switch SW3 may be coupled to the second node N2 and the ground node GND. As illustrated in FIG. 5, the fourth switch SW4 may be coupled to the ground node GND and a third node N3, and the fifth switch SW5 may be coupled to the third node N3 and the output node OUT. As described above with reference to FIG. 1, the first, second, third, fourth, and fifth switches SW1, SW2, SW3, SW4, and SW5 may be turned on or off based on the switch control signal C_SW provided by the switch controller 14.

The flying capacitor $C_F$ may be coupled to the second switch SW2 and the inductor L at the first node N1 and may be coupled to the first and third switches SW1 and SW3 at the second node N2. As described above with reference to FIGS. 3A and 4, when the first and second switches SW1 and SW2 are turned on and the third switch SW3 is turned off, the flying capacitor $C_F$ may be charged by the input voltage $V_{IN}$. On the other hand, as described above with reference to FIGS. 3B and 4, when the first and second switches SW1 and SW2 are turned off and the third switch SW3 is turned on, the flying capacitor $C_F$ may generate the negative voltage at the first node N1.

The inductor L may have the first terminal T1 coupled to the third node N3 and the second terminal T2 coupled to the first node N1 and the inductor current $I_L$ may flow from the first terminal T1 to the second terminal T2. Due to the fifth switch SW5, the inductor current $I_L$ may be the same as or different from the output delivery current $I_D$. For example, as described later with reference to FIG. 7A, when the third switch SW3 is turned off and the fifth switch SW5 is turned on, the inductor current $I_L$ may be equal to the output delivery current $I_D$ and flow to the ground node GND. On the other hand, as described later with reference to FIG. 7B, when the third switch SW3 is turned on and the fifth switch SW5 is turned off, the inductor current $I_L$ may be different from the output delivery current $I_D$ and may flow to the flying capacitor $C_F$.

The output capacitor $C_O$ may be coupled to the fifth switch SW5 at the output node OUT and may be coupled to the ground node GND. Therefore, when the fifth switch SW5 is turned on, the output capacitor $C_O$ may receive a part of the load current $I_O$ or may provide a part of the output delivery current $I_D$. On the other hand, when the fifth switch SW5 is turned off, the output capacitor $C_O$ may receive the output delivery current $I_D$. Hereinafter, as described later with reference to FIGS. 6, 7A, 7B, and 8, a voltage greater than $|V_{IN}|$ or $|V_{OUT}|$ may not be applied across any devices included in the inverting switching regulator 50 throughout the first phase P1 and the second phase P2.

Figure 6:
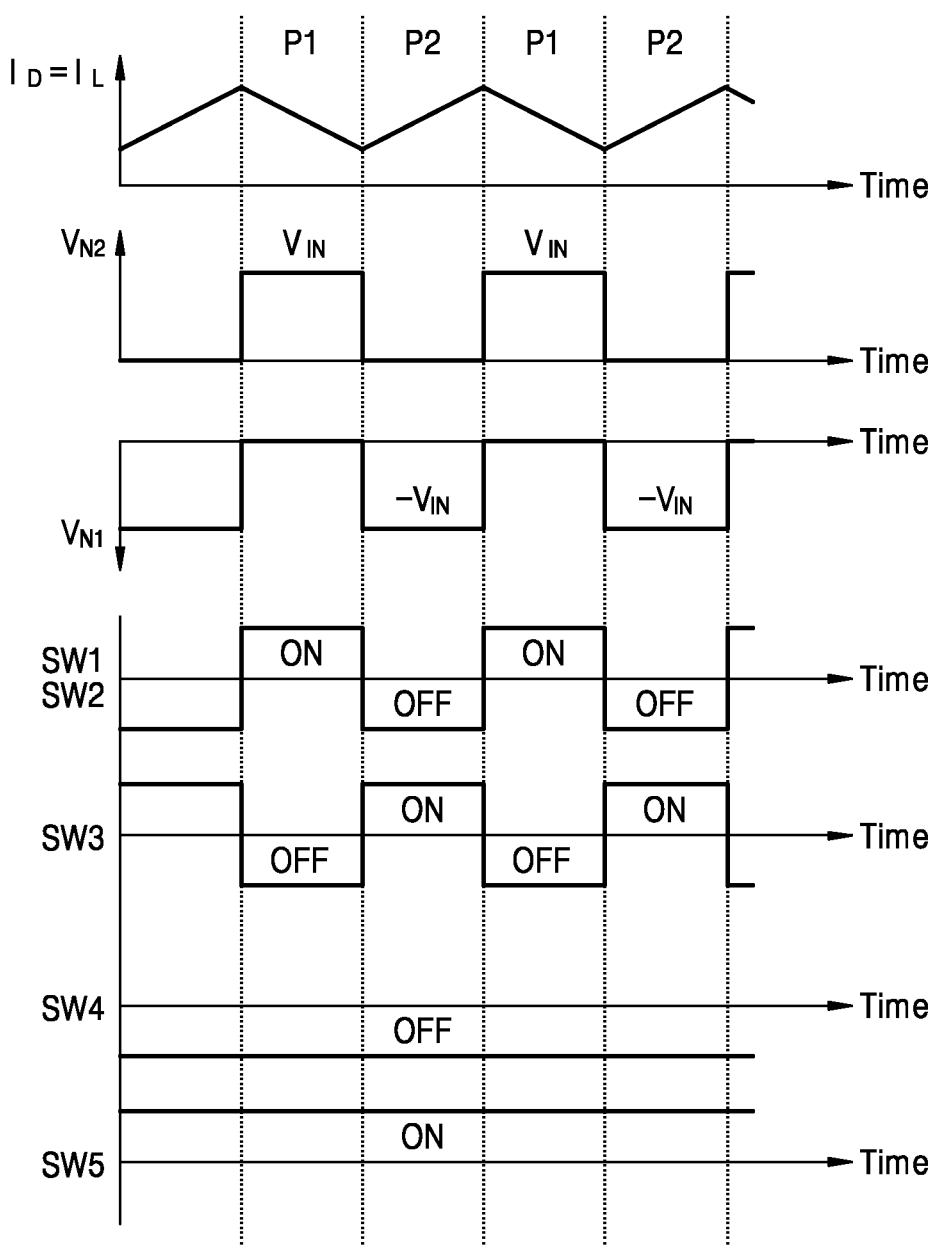
FIG. 6 is a timing diagram illustrating an example of an operation of the inverting switching regulator of FIG. 5 according to an embodiment.

FIG. 6 is a timing diagram illustrating an example of an operation of the inverting switching regulator 50 of FIG. 5 according to an embodiment. In detail, the timing diagram of FIG. 6 illustrates operation of the inverting switching regulator 50 set to the buck mode. Hereinafter, FIG. 6 will be described with reference to FIG. 5.

In some embodiments, the inverting switching regulator 50 of FIG. 5 may be set to the buck mode. For example, as illustrated in FIG. 6, throughout the first phase P1 and the second phase P2, the fourth switch SW4 may be turned off and the fifth switch SW5 may be turned on. Therefore, the inverting switching regulator 50 may have the same structure as the inverting switching regulator 20 of FIG. 2 that functions as the buck converter. That is, the inverting switching regulator 50 may correspond to the equivalent circuit 30a of FIG. 3A in the first phase P1 and may correspond to the equivalent circuit 30b of FIG. 3B in the second phase.

Referring to FIGS. 5 and 6, during the first phase P1, the first and second switches SW1 and SW2 may be turned on and the third switch SW3 may be turned off. As illustrated in FIG. 6, during the first phase P1, the voltage $V_{N2}$ of the second node N2 may be equal to the input voltage $V_{IN}$ and the voltage $V_{N1}$ of the first node N1 may be equal to the ground potential. Therefore, the input voltage $V_{IN}$ may be applied to the flying capacitor $C_F$ and the flying capacitor $C_F$ may be charged by the input voltage $V_{IN}$. In addition, the inductor current $I_L$ may flow from the output node OUT to the ground node GND through the inductor L and, as illustrated in FIG. 6, may gradually reduce due to the ground potential.

Referring to FIGS. 5 and 6, during the second phase P2, the first and second switches SW1 and SW2 may be turned off and the third switch SW3 may be turned on. As illustrated in FIG. 6, during the second phase P2, the voltage $V_{N2}$ of the second node N2 may be equal to the ground potential and, when the second phase P2 starts, the voltage $V_{N1}$ of the first node N1 may be equal to the voltage $-V_{IN}$ obtained by inverting the input voltage $V_{IN}$. Therefore, when the second phase P2 starts, the negative voltage $-V_{INT}$ may be applied to the second terminal T2 of the inductor L. In addition, the inductor current $I_L$ may flow from the output node OUT to the flying capacitor $C_F$ through the inductor L and, as illustrated in FIG. 6, may gradually increase due to the negative voltage $-V_{IN}$. According to some embodiments, during the second phase P2, the voltage $V_{N1}$ of the first node N1 may gradually increase due to the inductor current $I_L$.

Figure 7A:
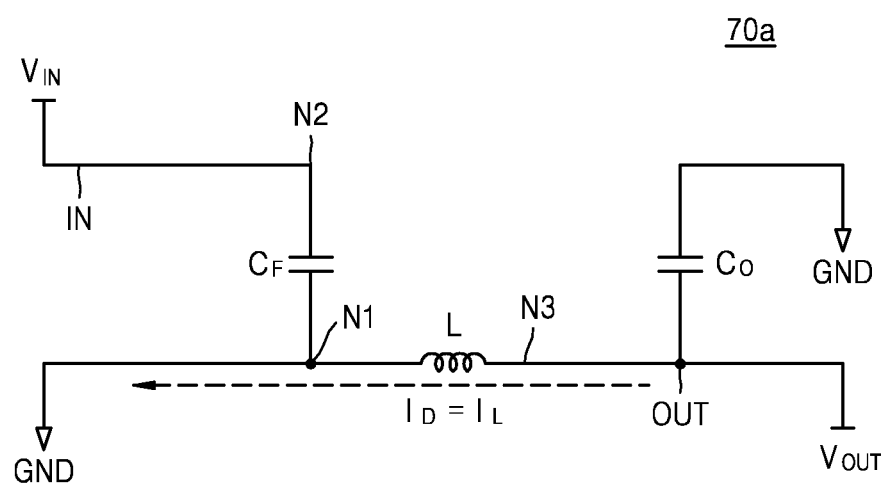
FIGS. 7A and 7B are circuit diagrams illustrating equivalent circuits of the inverting switching regulator of FIG. 5 according to embodiments.
Figure 7B:
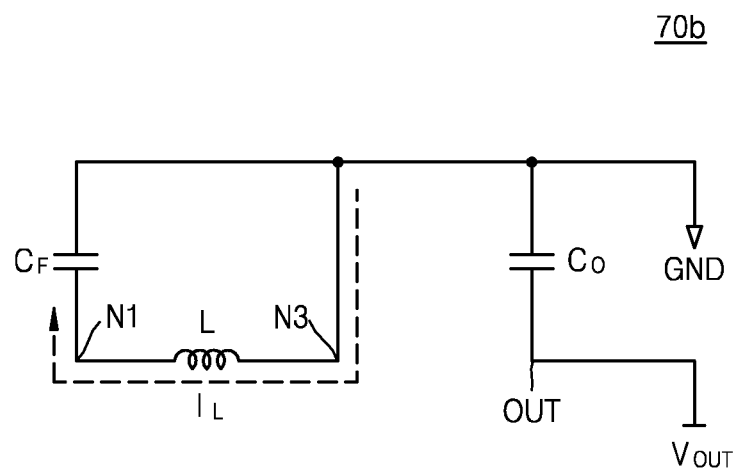
Figure 8:
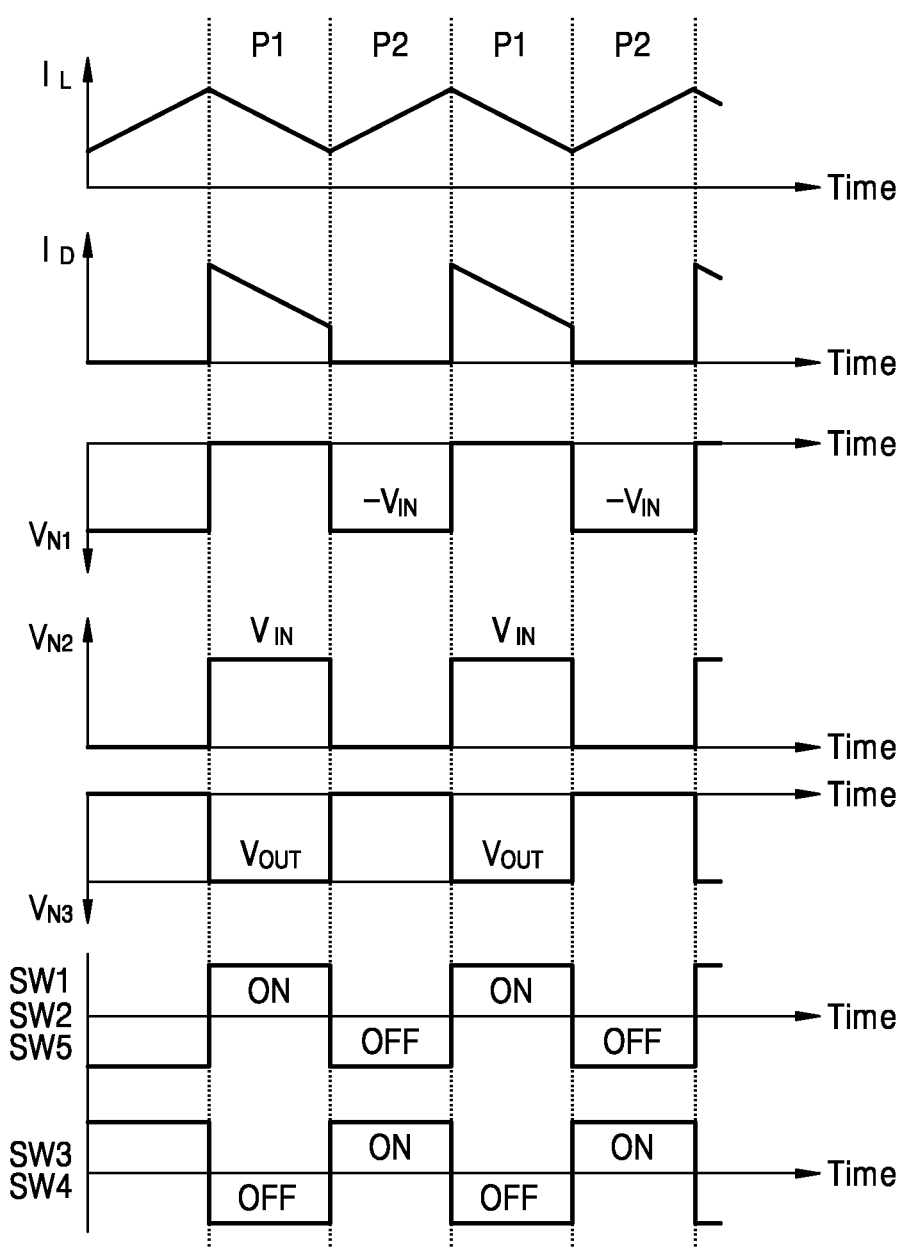
FIG. 8 is a timing diagram illustrating an example of an operation of the inverting switching regulator of FIG. 5 according to an embodiment.

FIGS. 7A and 7B are circuit diagrams illustrating equivalent circuits of the inverting switching regulator 50 of FIG. 5 according to embodiments. FIG. 8 is a timing diagram illustrating an example of an operation of the inverting switching regulator 50 of FIG. 5 according to an embodiment. In detail, the circuit diagram of FIG. 7A illustrates an equivalent circuit 70a of the inverting switching regulator 50 and a path of the inductor current $I_L$ in the boost mode during the first phase P1. The circuit diagram of FIG. 7B illustrates an equivalent circuit 70b of the inverting switching regulator 50 and the path of the inductor current $I_L$ in the boost mode during the second phase P2. The timing diagram of FIG. 8 illustrates an example of an operation of the inverting switching regulator 50 in the boost mode. In some embodiments, the inverting switching regulator 50 of FIG. 5 may be set to the boost mode. As illustrated in FIG. 8, throughout the first phase P1 and the second phase P2, not only the first, second, and third switches SW1, SW2, and SW3 but also the fourth and fifth switches SW4 and SW5 may be transited between on/off. Hereinafter, FIGS. 7A, 7B, and 8 will be described with reference to FIG. 5.

Referring to FIGS. 7A and 8, during the first phase P1, the first, second, and fifth switches SW1, SW2, and SW5 may be turned on and the third and fourth switches SW3 and SW4 may be turned off and accordingly, the equivalent circuit 70a of FIG. 7A may be formed. As illustrated in FIG. 8, during the first phase P1, the voltage $V_{N2}$ of the second node N2 may be equal to the input voltage $V_{IN}$ and the voltage $V_{N1}$ of the first node N1 may be equal to the ground potential. Therefore, the input voltage $V_{IN}$ may be applied to the flying capacitor $C_F$ and the flying capacitor $C_F$ may be charged by the input voltage $V_{IN}$. In addition, a voltage $V_{N3}$ of the third node N3 may be equal to the output voltage $V_{OUT}$. As illustrated in FIG. 7A, the inductor current $I_L$ may flow from the output node OUT to the ground node GND through the inductor L. Therefore, as illustrated in FIG. 8, the inductor current $I_L$ may gradually reduce due to the ground potential.

Referring to FIGS. 7B and 8, during the second phase P2, the first, second, and fifth switches SW1, SW2, and SW5 may be turned off and the third and fourth switches SW3 and SW4 may be turned on and accordingly, the equivalent circuit 70b of FIG. 7B may be formed. As illustrated in FIG. 8, during the second phase P2, the voltage $V_{N2}$ of the second node N2 may be equal to the ground potential and, when the second phase P2 starts, the voltage $V_{N1}$ of the first node N1 may be equal to the voltage $-V_{INT}$ obtained by inverting the input voltage $V_{IN}$. Therefore, when the second phase P2 starts, the negative voltage $-V_{IN}$ may be applied to the second terminal T2 of the inductor L. In addition, the voltage $V_{N3}$ of the third node N3 may be equal to the ground potential. As illustrated in FIG. 7B, the inductor current $I_L$ may flow from the ground node GND to the flying capacitor $C_F$ through the inductor L. Therefore, as illustrated in FIG. 8, the inductor current $I_L$ may gradually increase due to the negative voltage $-V_{IN}$. According to some embodiments, during the second phase P2, the voltage $V_{N1}$ of the first node N1 may gradually increase due to the inductor current $I_L$.

Figure 9:
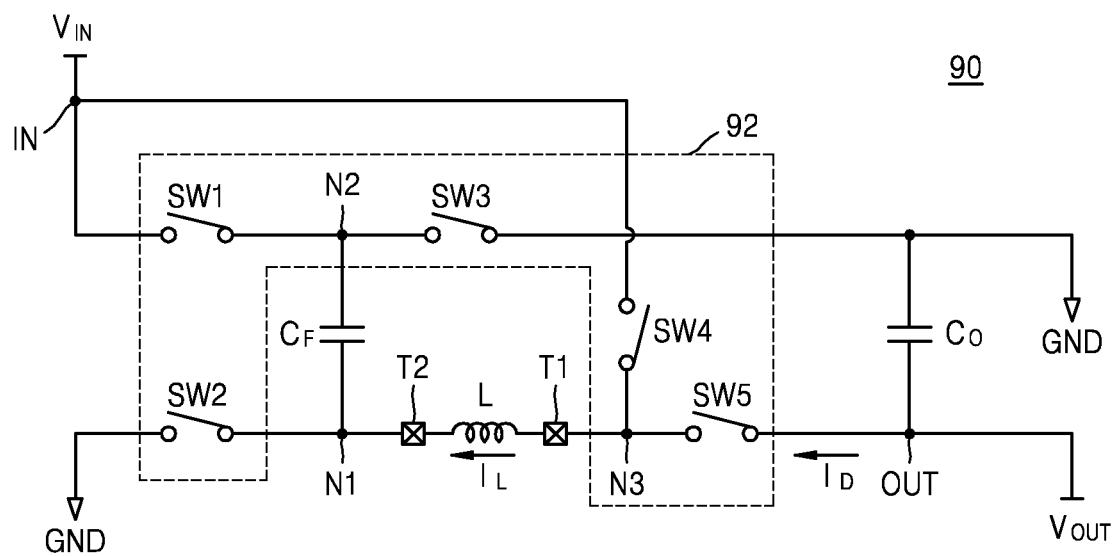
FIG. 9 is a circuit diagram of an inverting switching regulator according to an embodiment.

FIG. 9 is a circuit diagram of an inverting switching regulator 90 according to an embodiment. In detail, the circuit diagram of FIG. 9 illustrates the inverting switching regulator 90 that functions as the inverting buck-boost converter. The inverting switching regulator 90 may be set to the buck mode as described above with reference to FIG. 6 or may be set to the boost mode as described later with reference to FIG. 10. In some embodiments, the inverting switching regulator 90 of FIG. 9 may generate the output voltage $V_{OUT}$ lower than the output voltage $V_{OUT}$ generated by the inverting switching regulator 50 of FIG. 5 in the boost mode. Therefore, the boost mode of the inverting switching regulator 90 of FIG. 9 may be referred to as a wide inverting boost mode or a wide boost mode. As described above with reference to FIG. 1, the inverting switching regulator 90 may include a switch circuit 92, the flying capacitor $C_F$, the inductor L, and the output capacitor $C_O$.

The switch circuit 92 may include first, second, third, fourth, and fifth switches SW1, SW2, SW3, SW4, and SW5. Like in the inverting switching regulator 50 of FIG. 5, the first switch SW1 may be coupled to the input node IN and the second node N2, the second switch SW2 may be coupled to the ground node GND and the first node N1, the third switch SW3 may be coupled to the second node N2 and the ground node GND, and the fifth switch SW5 may be coupled to the third node N3 and the output node OUT. As illustrated in FIG. 9, the fourth switch SW4 may be coupled to the input node IN and the third node N3. As described above with reference to FIG. 1, the first, second, third, fourth, and fifth switches SW1, SW2, SW3, SW4, and SW5 may be turned on or off based on the switch control signal C_SW provided by the switch controller 14.

The flying capacitor $C_F$ may be coupled to the second switch SW2 and the inductor L at the first node N1, and may be coupled to the first and third switches SW1 and SW3 at the second node N2. As described above with reference to FIGS. 7A and 8, when the first and second switches SW1 and SW2 are turned on and the third switch SW3 is turned off, the flying capacitor $C_F$ may be charged by the input voltage $V_{IN}$. On the other hand, as described above with reference to FIGS. 7B and 8, when the first and second switches SW1 and SW2 are turned off and the third switch SW3 is turned on, the flying capacitor $C_F$ may generate the negative voltage at the first node $N_1$.

The inductor L may have the first terminal T1 coupled to the third node N3 and the second terminal T2 coupled to the first node N1. The inductor current $I_L$ may flow from the first terminal T1 to the second terminal T2. Due to the fifth switch SW5, the inductor current $I_L$ may be the same as or different from the output delivery current $I_D$. The output capacitor $C_O$ may be coupled to the fifth switch SW5 at the output node OUT and may be coupled to the ground node GND. Therefore, the output capacitor $C_O$ may receive a part of the load current $I_O$ or may provide a part of the output delivery current $I_D$ when the fifth switch SW5 is turned on and may receive the output delivery current $I_D$ when the fifth switch SW5 is turned off.

In some embodiments, the inverting switching regulator 90 may be set to the buck mode. For example, in the buck mode, the fourth switch SW4 may be always turned off and the fifth switch SW5 may be always turned on. Therefore, the inverting switching regulator 90 may correspond to the equivalent circuit 30a of FIG. 3A during the first phase P1 and may correspond to the equivalent circuit 30b of FIG. 3B during the second phase P2. Therefore, as the inverting switching regulator 50 of FIG. 5 operates in the buck mode, the inverting switching regulator 90 of FIG. 9 may operate in the buck mode as described above with reference to FIG. 6.

Figure 10:
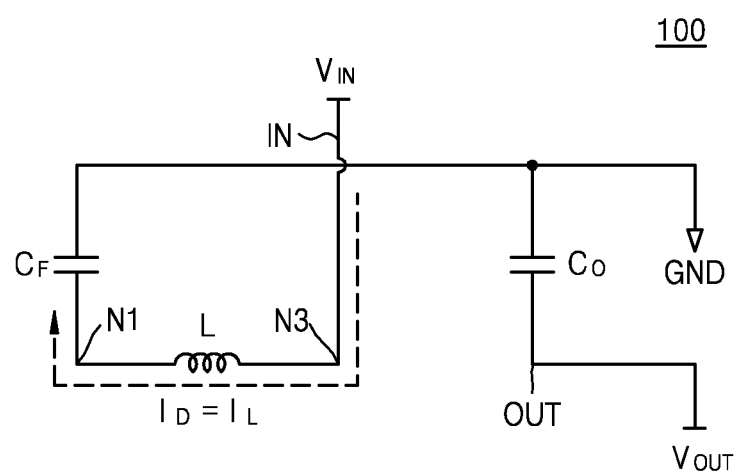
FIG. 10 is a circuit diagram illustrating an equivalent circuit of the inverting switching regulator of FIG. 9 according to an embodiment.
Figure 11:
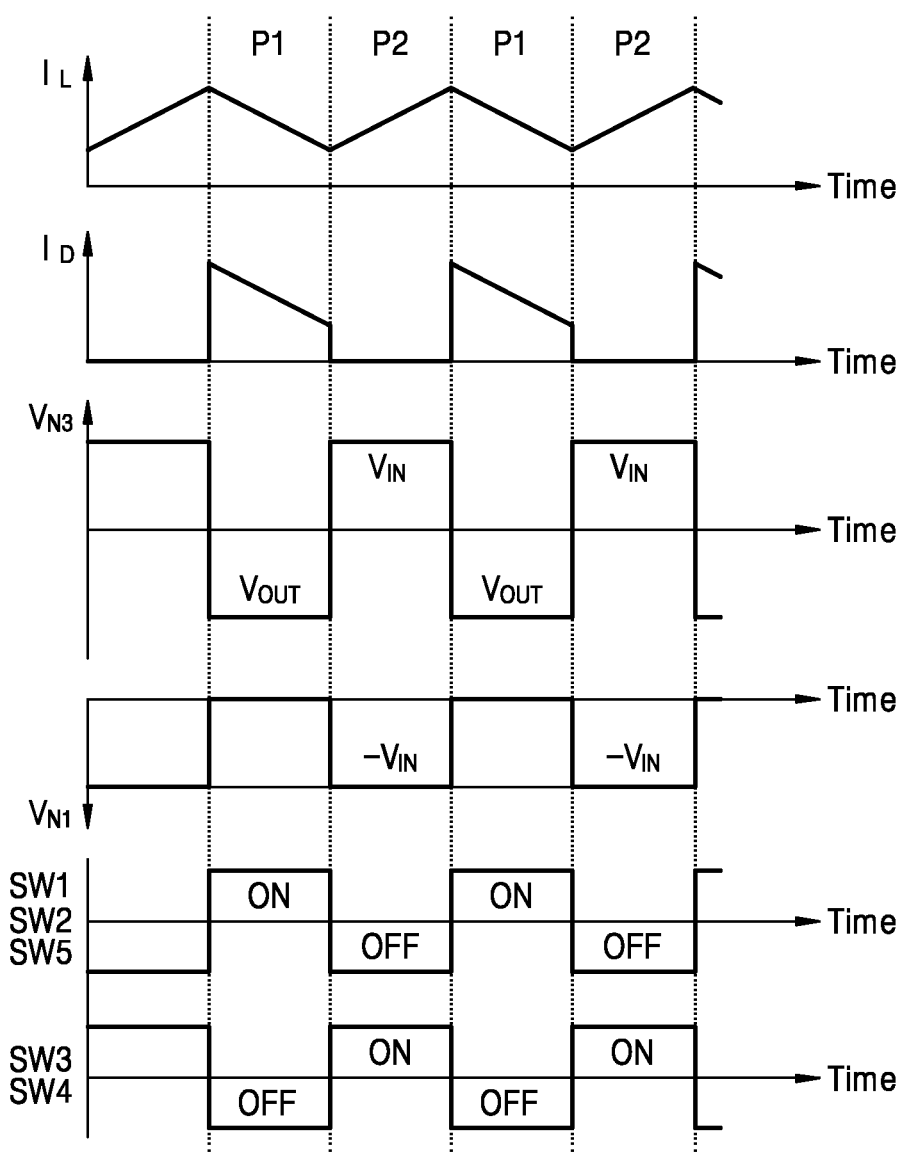
FIG. 11 is a timing diagram illustrating an example of an operation of the inverting switching regulator of FIG. 9 according to an embodiment.

FIG. 10 is a circuit diagram illustrating an equivalent circuit 100 of the inverting switching regulator 90 of FIG. 9 according to an embodiment. FIG. 11 is a timing diagram illustrating an example of an operation of the inverting switching regulator 90 of FIG. 9 according to an embodiment. In detail, the circuit diagram of FIG. 10 illustrates the equivalent circuit 100 of the inverting switching regulator 90 and the path of the inductor current $I_L$ in the boost mode (or the wide boost mode) during the second phase P2 and the timing diagram of FIG. 11 illustrates the example of operation of the inverting switching regulator 90 in the boost mode. Hereinafter, FIGS. 10 and 11 will be described with reference to FIG. 9.

The inverting switching regulator 90 of FIG. 9 may correspond to an equivalent circuit that is the same as the equivalent circuit 70a of FIG. 7A in the boost mode during the first phase P1. Referring to FIG. 11, in the boost mode, during the first phase P1, the first, second, and fifth switches SW1, SW2, and SW5 may be turned on and the third and fourth switches SW3 and SW4 may be turned off. As illustrated in FIG. 11, during the first phase P1, the voltage $V_{N2}$ of the second node N2 may be equal to the input voltage $V_{IN}$ and the voltage $V_{N1}$ of the first node N1 may be equal to the ground potential. Therefore, the input voltage $V_{IN}$ may be applied to the flying capacitor $C_F$ and the flying capacitor $C_F$ may be charged by the input voltage $V_{IN}$. In addition, the voltage $V_{N3}$ of the third node N3 may be equal to the output voltage $V_{OUT}$. As illustrated in FIG. 7A, the inductor current $I_L$ may flow from the output node OUT to the ground node GND through the inductor L. Therefore, as illustrated in FIG. 11, the inductor current $I_L$ may gradually reduce due to the ground potential.

Referring to FIGS. 10 and 11, during the second phase P2, the first, second, and fifth switches SW1, SW2, and SW5 may be turned off and the third and fourth switches SW3 and SW4 may be turned on. Therefore, the equivalent circuit 100 of FIG. 10 may be formed. In comparison with the equivalent circuit 70b of FIG. 7B, in the equivalent circuit 100 of FIG. 10, the third node N3 may be connected to the input node IN instead of the ground node GND. Therefore, a voltage higher than that applied to both terminals of the inductor L of the equivalent circuit 70b of FIG. 7B may be applied to both terminals of the inductor L of FIG. 10. Therefore, in the second phase P2, the high inductor current $I_L$ may be generated. As a result, the lower output voltage $V_{OUT}$ may be generated.

Referring to FIG. 11, during the second phase P2, the voltage $V_{N2}$ of the second node N2 may be equal to the ground potential and, when the second phase P2 starts, the voltage $V_{N1}$ of the first node N1 may be equal to the voltage $-V_{IN}$ obtained by inverting the input voltage $V_{IN}$. Therefore, when the second phase P2 starts, the negative voltage $-V_{IN}$ may be applied to the second terminal T2 of the inductor L. In addition, the voltage $V_{N3}$ of the third node N3 may be equal to the input voltage $V_{IN}$. As illustrated in FIG. 10, the inductor current $I_L$ may flow from the input node IN to the flying capacitor $C_F$ through the inductor L. Therefore, as illustrated in FIG. 11, the inductor current $I_L$ may gradually increase due to the negative voltage $-V_{IN}$. According to some embodiments, during the second phase P2, the voltage $V_{N1}$ of the first node N1 may gradually increase due to the inductor current $I_L$.

Figure 12:
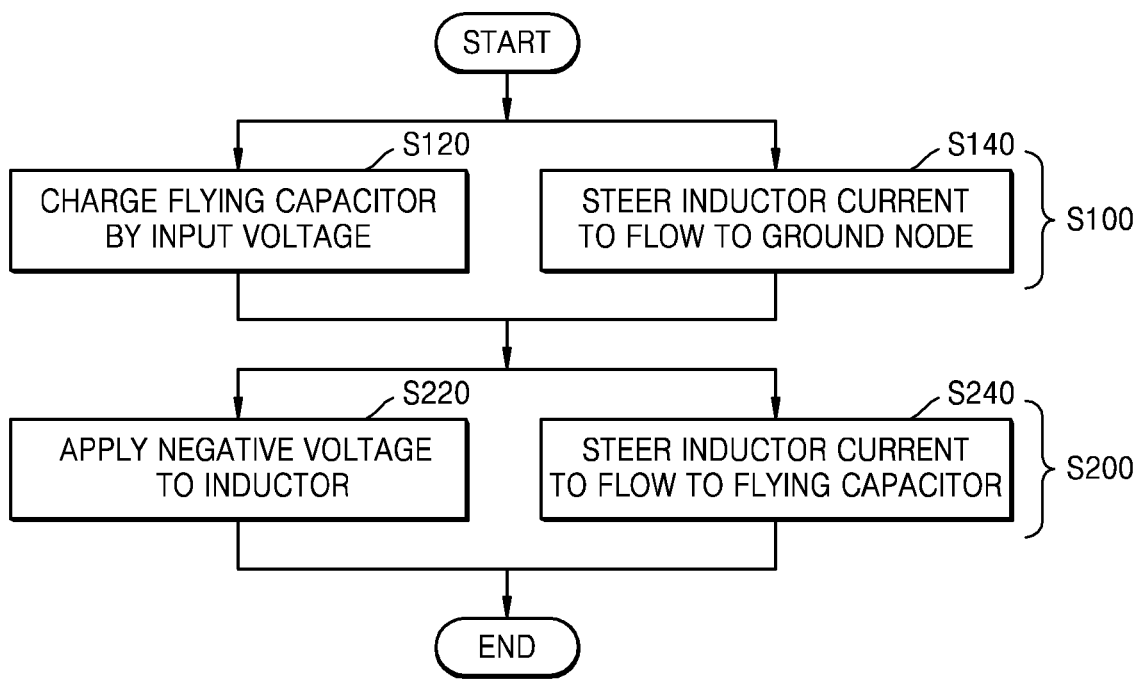
FIG. 12 is a flowchart illustrating a method of converting a positive input voltage into a negative output voltage according to an embodiment.

FIG. 12 is a flowchart illustrating a method of converting a positive input voltage into a negative output voltage according to an embodiment. As illustrated in FIG. 12, the method of converting the input voltage into the output voltage may include operation S100 and operation S200. Operation S100 may be performed in the first phase P1 and operation S200 may be performed in the second phase P2. In some embodiments, the method of FIG. 12 may be performed by the inverting switching regulator 10 of FIG. 1 and may be referred to as a method of operating the inverting switching regulator 10. Hereinafter, FIG. 12 will be described with reference to FIG. 1.

Referring to FIG. 12, operation S100 may include operation S120 and operation S140 that may be performed in parallel. In operation S120, an operation of charging the flying capacitor $C_F$ by the input voltage $V_{IN}$ may be performed. For example, as described above with reference to the drawings, the flying capacitor $C_F$ may be connected to the input node IN during the first phase P1 and may charge charges proportional to the input voltage $V_{IN}$ and the capacitance of the flying capacitor $C_F$. An example of operation S120 will be described later with reference to FIG. 13. In addition, in operation S140, an operation of steering the inductor current $I_L$ to flow to the ground node GND may be performed. For example, as described above with reference to the drawings, the inductor L may be connected to the ground node GND during the first phase P1 and the inductor current $I_L$ may flow to the ground node GND. Examples of operation S140 will be described later with reference to FIGS. 14A and 14B.

Operation S200 may include operation S220 and operation S240 that may be performed in parallel. In operation S220, an operation of applying the negative voltage to the inductor L may be performed. For example, as described above with reference to the drawings, due to the charges stored in the flying capacitor $C_F$, the negative voltage may be applied to the inductor L during the second phase P2. An example of operation S220 will be described later with reference to FIG. 15. In addition, in operation S240, an operation of steering the inductor current $I_L$ to flow to the flying capacitor $C_F$ may be performed. For example, as described above with reference to the drawings, the inductor L may be connected to the flying capacitor $C_F$ during the second phase P2 and the inductor current $I_L$ may flow to the flying capacitor $C_F$. Examples of operation S240 will be described later with reference to FIGS. 16A, 16B, and 16C.

Figure 13:
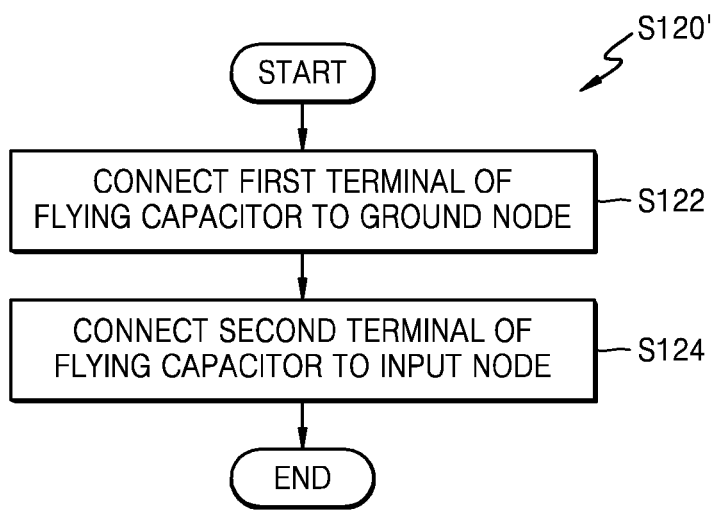
FIG. 13 is a flowchart illustrating a method of converting a positive input voltage into a negative output voltage according to an embodiment.

FIG. 13 is a flowchart illustrating a method of converting a positive input voltage into a negative output voltage according to an embodiment. In detail, the flowchart of FIG. 13 illustrates an example of operation S120 of FIG. 12. As described above with reference to FIG. 12, operation S120' of FIG. 13 may be performed during the first phase P1 and, in operation S120' an operation of charging the flying capacitor $C_F$ by the input voltage $V_{IN}$ may be performed. In some embodiments, operation S120' may be performed by the inverting switching regulator 20 of FIG. 2. Hereinafter, FIG. 13 will be described hereinafter with reference to FIGS. 2 and 12.

Referring to FIG. 13, operation S120' may include operation S122 and operation S124. In some embodiments, operation S122 and operation S124 may be performed in an order different from that illustrated in FIG. 13. In operation S122, an operation of connecting a first terminal of the flying capacitor $C_F$ to the ground node GND may be performed. For example, a first terminal of the flying capacitor $C_F$ may refer to a terminal coupled to the first node N1 and the first node N1 may be connected to the ground node GND by turning on the second switch SW2. In addition, in operation S124, an operation of connecting a second terminal of the flying capacitor $C_F$ to the input node IN may be performed. For example, the second terminal of the flying capacitor $C_F$ may refer to a terminal coupled to the second node N2 and the second node N2 may be connected to the input node IN by turning on the first switch SW1 and turning off the third switch SW3.

Figure 14A:
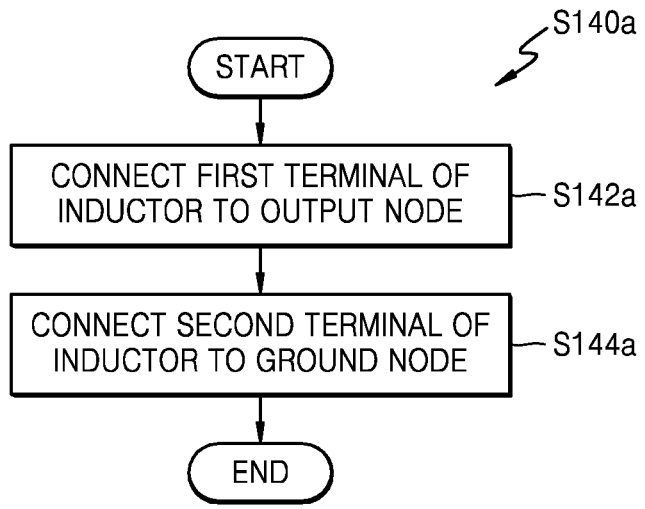
FIGS. 14A and 14B are flowcharts illustrating examples of a method of converting a positive input voltage into a negative output voltage according to embodiments.
Figure 14B:
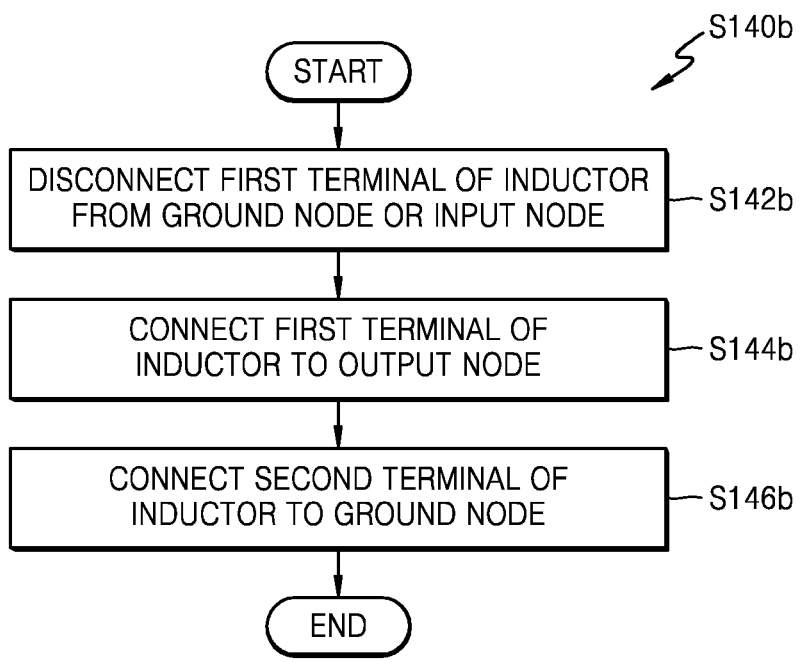

FIGS. 14A and 14B are flowcharts illustrating examples of a method of converting a positive input voltage into a negative output voltage according to embodiments. In detail, the flowchart of FIG. 14A illustrates an example of operation S140 of FIG. 12, which is performed by the inverting switching regulator 20 of FIG. 2, and the flowchart of FIG. 14B illustrates an example of operation S140 of FIG. 12, which is performed by the inverting switching regulator 50 of FIG. 5 or the inverting switching regulator 90 of FIG. 9. As described above with reference to FIG. 12, operation S140a and operation S140b of FIGS. 14A and 14B may be performed during the first phase P1 and, in operation S140a and operation S140b, the operation of steering the inductor current $I_L$ to flow to the ground node GND may be performed. Hereinafter, FIGS. 14A and 14B will be described with reference to FIGS. 2, 5, and 9.

Referring to FIG. 14A, operation S140a may include operation S142a and operation S144a. In some embodiments, operation S142a and operation S144a may be performed in an order different from that illustrated in FIG. 14A. In operation S142a, an operation of connecting the first terminal T1 of the inductor L to the output node OUT may be performed. In some embodiments, unlike in FIG. 2, when the inductor L is not coupled to the output node OUT and is connected to the output node OUT through at least one switch, by turning on at least one switch between the inductor L and the output node OUT, the first terminal T1 of the inductor L may be connected to the output node OUT. In some embodiments, as illustrated in FIG. 2, when the inductor L is coupled to the output node OUT, operation S142a may be omitted. In addition, in operation S144a, an operation of connecting the second terminal T2 of the inductor L to the ground node GND may be performed. For example, the second terminal T2 of the inductor L may be coupled to the first node N1 and, by turning on the second switch SW2, the first node N1 may be connected to the ground node GND. Therefore, the inductor current $I_L$ may flow from the output node OUT to the ground node GND through the inductor L.

Referring to FIG. 14B, operation S140b may include operation S142b, operation S144b, and operation S146b. In some embodiments, unlike in FIG. 14B, operation S146b may be performed prior to operation S142b or may be performed in parallel with operation S142b and operation S144b. In operation S142b, an operation of disconnecting the first terminal T1 of the inductor L from the ground node GND or the input node IN may be performed. In some embodiments, in the inverting switching regulator 50 of FIG. 5, by turning off the fourth switch SW4, the first terminal T1 of the inductor L may be disconnected from the ground node GND. In some embodiments, in the inverting switching regulator 90 of FIG. 9, by turning off the fourth switch SW4, the first terminal T1 of the inductor L may be disconnected from the input node IN. In addition, in operation S144b, an operation of connecting the first terminal T1 of the inductor L to the output node OUT may be performed. For example, the inductor L may be coupled to the third node N3 and, by turning on the fifth switch SW5 of FIG. 5 or 9, the third node N3 may be connected to the output node OUT. In addition, in operation S146b, an operation of connecting the second terminal T2 of the inductor L to the ground node GND may be performed. For example, the second terminal T2 of the inductor L may be coupled to the first node N1 and, by turning on the second switch SW2 of FIG. 5 or 9, the first node N1 may be connected to the ground node GND. Therefore, the inductor current $I_L$ may flow from the output node OUT to the ground node GND through the inductor L.

Figure 15:
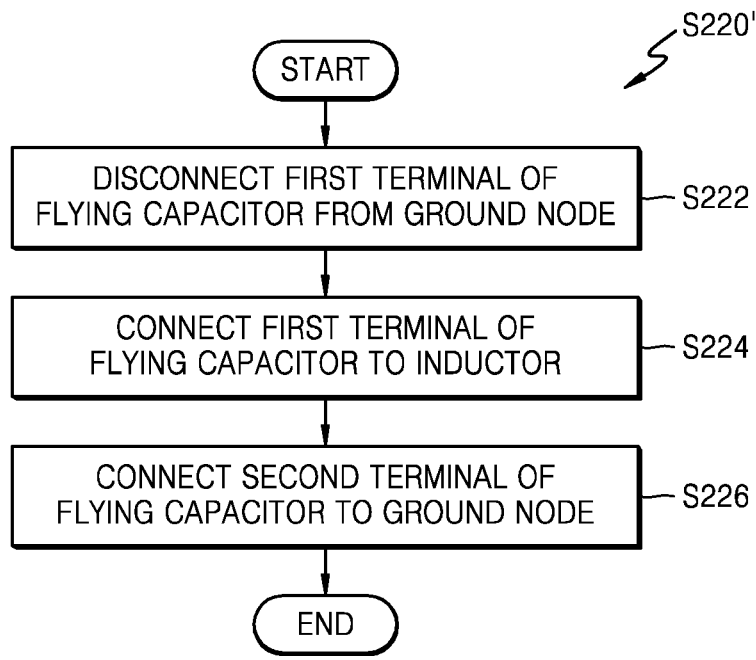
FIG. 15 is a flowchart illustrating a method of converting a positive input voltage into a negative output voltage according to an embodiment.

FIG. 15 is a flowchart illustrating a method of converting a positive input voltage into a negative output voltage according to an embodiment. In detail, the flowchart of FIG. 15 illustrates an example of operation S220 of FIG. 15. As described above with reference to FIG. 12, operation S220' may be performed during the second phase P2 and, in operation S220', an operation of applying the negative voltage to the inductor L may be performed. In some embodiments, operation S220' may be performed by the inverting switching regulator 20 of FIG. 2. Hereinafter, FIG. 15 will be described with reference to FIGS. 2 and 12.

Referring to FIG. 15, operation S220' may include operation S222, operation S224, and operation S226. In some embodiments, operation S222, operation S224, and operation S226 may be performed in an order different from that illustrated in FIG. 15. In operation S222, an operation of disconnecting the first terminal of the flying capacitor $C_F$ from the ground node GND may be performed. For example, the first terminal of the flying capacitor $C_F$ may refer to the terminal coupled to the first node N1 and, by turning off the second switch SW2, the first node N1 may be disconnected from the ground node GND. In addition, in operation S224, an operation of connecting the first terminal of the flying capacitor $C_F$ to the inductor L may be performed. In some embodiments, unlike in FIG. 2, when the flying capacitor $C_F$ is not coupled to the inductor L and is connected to the inductor L through at least one switch, by turning on at least one switch between the flying capacitor $C_F$ and the inductor L, in operation S222, the first terminal of the flying capacitor $C_F$ disconnected from the ground node GND may be connected to the inductor L. In some embodiments, as illustrated in FIG. 2, when the flying capacitor $C_F$ and the inductor L are coupled, operation S224 may be omitted. In addition, in operation S226, an operation of connecting the second terminal of the flying capacitor $C_F$ to the ground node GND may be performed. For example, the second terminal of the flying capacitor $C_F$ may refer to the terminal coupled to the second node N2 and, by turning off the second switch SW2 and turning on the third switch SW3, the second node N2 may be connected to the ground node GND. Therefore, due to the charges stored in the flying capacitor $C_F$, voltage drop corresponding to that generated at the second node N2 may be generated at the first node N1. As a result, the negative voltage, for example, the voltage $-V_{IN}$ T obtained by inverting the input voltage $V_{IN}$ may be generated at the first node N1.

Figure 16A:
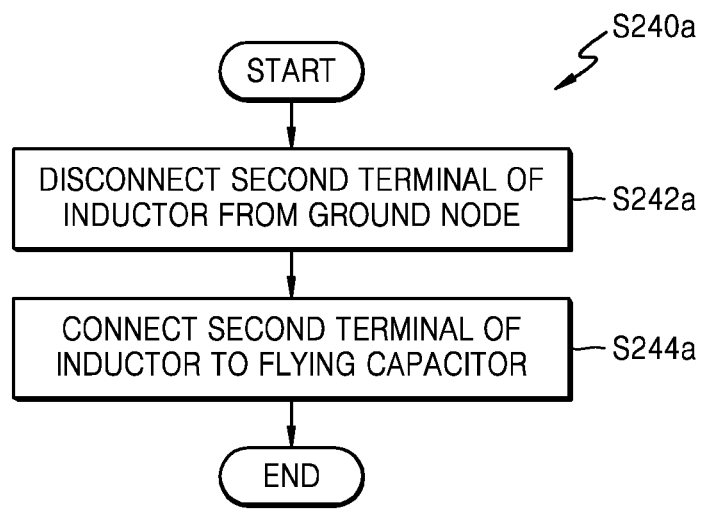
FIGS. 16A, 16B, and 16C are flowcharts illustrating examples of a method of converting a positive input voltage into a negative output voltage according to embodiments.
Figure 16B:
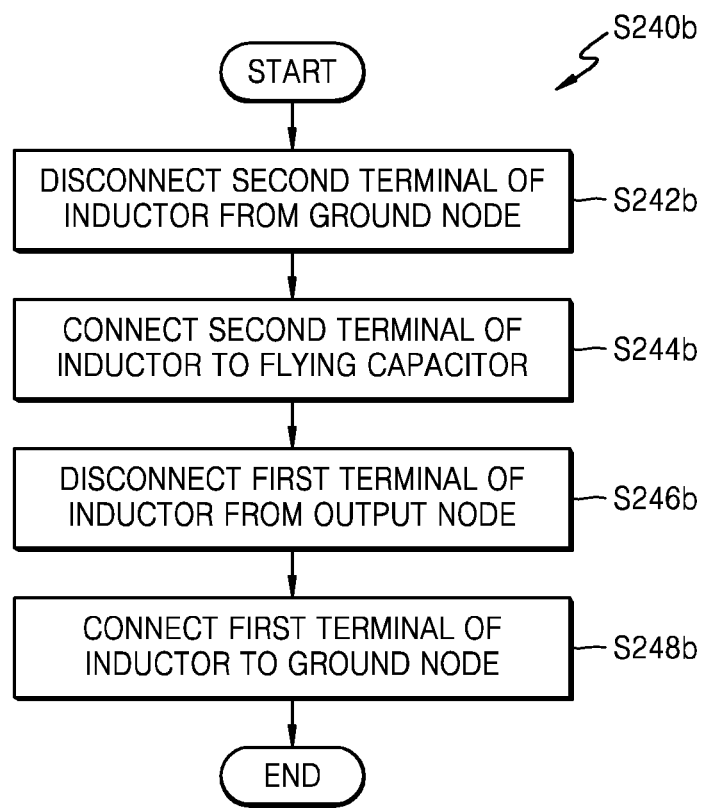
Figure 16C:
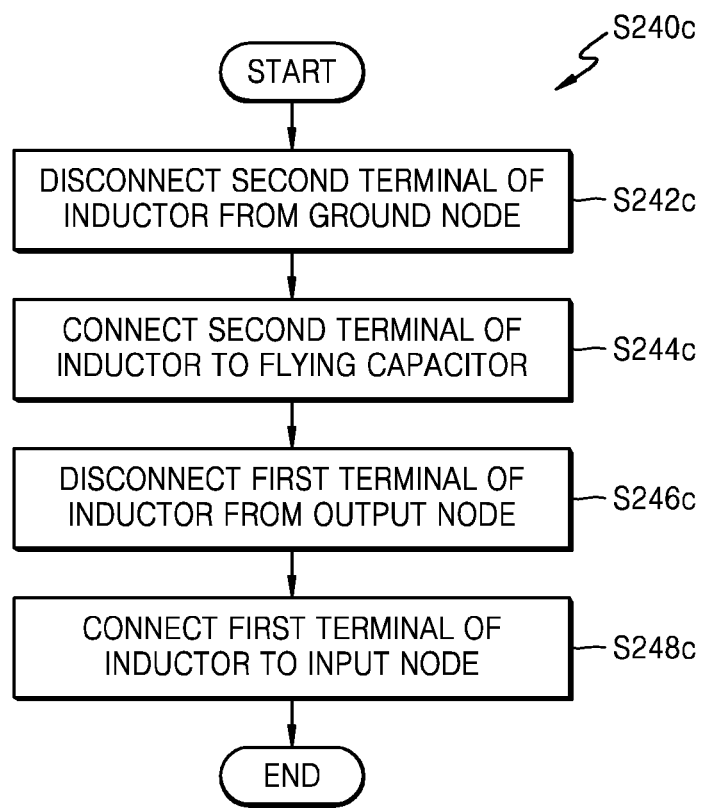

FIGS. 16A, 16B, and 16C are flowcharts illustrating examples of a method of converting a positive input voltage into a negative output voltage according to embodiments. In detail, the flowchart of FIG. 16A illustrates an example of operation S240 of FIG. 12, which is performed by the buck converter or the buck-boost converter in the buck mode and flowcharts of FIGS. 16B and 16C illustrate examples of operation S240 of FIG. 12, which is performed by the boost converter or the buck-boost converter in the boost mode. As described above with reference to FIG. 12, operation S240a, operation S240b, and operation S240c of FIGS. 16A, 16B, and 16C may be performed during the second phase P2 and, in operation S240a, operation S240b and operation S240c, the operation of steering the inductor current $I_L$ to flow to the flying capacitor $C_F$ may be performed. In some embodiments, operation S240a of FIG. 16A may be performed by the inverting switching regulator 20 of FIG. 2, operation S240b of FIG. 16B may be performed by the inverting switching regulator 50 of FIG. 5, and operation S240c of FIG. 16C may be performed by the inverting switching regulator 90 of FIG. 9. Hereinafter, FIGS. 16A, 16B, and 16C will be described with reference to FIGS. 2, 5, and 9. Description previously made with reference to FIGS. 16A, 16B, and 16C will be omitted.

Referring to FIG. 16A, operation S240a may include operation S242a and operation S244a. In some embodiments, operation S242a and operation S244a may be performed in an order different from that illustrated in FIG. 16A. In operation S242a, an operation of disconnecting the second terminal T2 of the inductor L from the ground node GND may be performed. For example, as illustrated in FIG. 2, the second terminal T2 of the inductor L may be coupled to the first node N1 and, by turning off the second switch SW2, the first node N1 may be disconnected from the ground node GND. In addition, in operation S244a, an operation of connecting the second terminal T2 of the inductor L to the flying capacitor $C_F$ may be performed. In some embodiments, unlike in FIG. 2, when the inductor L is not coupled to the flying capacitor $C_F$ and is connected to the flying capacitor $C_F$ through at least one switch, by turning on at least one switch between the inductor L and the flying capacitor $C_F$, in operation S242a, the second terminal T2 of the inductor L disconnected from the ground node GND may be connected to the flying capacitor $C_F$. In some embodiments, as illustrated in FIG. 2, when the inductor L and the flying capacitor $C_F$ are coupled, operation S242a may be omitted.

Referring to FIG. 16B, operation S240b may include operation S242b, operation S244b, operation S246, and operation S248b. In some embodiments, operation S242b, operation S244b, operation S246, and operation S248b may be performed in an order different from that illustrated in FIG. 16B. Like in operation S242a and operation S244a of FIG. 16A, in operation S242b, an operation of disconnecting the second terminal T2 of the inductor L from the ground node GND may be performed and, in operation S244b, the operation of connecting the second terminal T2 of the inductor L to the flying capacitor $C_F$ may be performed.

In operation S246b, an operation of disconnecting the first terminal T1 of the inductor L from the output node OUT may be performed. For example, as illustrated in FIG. 5, the first terminal T1 of the inductor L may be coupled to the third node N3 and, by turning off the fifth switch SW5, the third node N3 may be disconnected from the output node OUT. In addition, in operation S248b, an operation of connecting the first terminal T1 of the inductor L to the ground node GND may be performed. For example, as illustrated in FIG. 5, the fourth switch SW4 may be coupled to the ground node GND and the third node N3 and, by turning on the fourth switch SW4, the third node N3 may be connected to the ground node GND. Therefore, the inductor current $I_L$ may flow from the ground node GND to the flying capacitor $C_F$ through the inductor L.

Referring to FIG. 16C, operation S240c may include operation S242c, operation S244c, operation S246c, and operation S248c. In some embodiments, operation S242c, operation S244c, operation S246c, and operation S248c may be performed in an order different from that illustrated in FIG. 16C. Like in operation S242a and operation S244a of FIG. 16A, in operation S242c, the operation of disconnecting the second terminal T2 of the inductor L from the ground node GND may be performed and, in operation S244c, the operation of connecting the second terminal T2 of the inductor L to the flying capacitor $C_F$ may be performed.

In operation S246c, the operation of disconnecting the first terminal T1 of the inductor L from the output node OUT may be performed. For example, as illustrated in FIG. 9, the first terminal T1 of the inductor L may be coupled to the third node N3 and, by turning off the fifth switch SW5, the third node N3 may be disconnected from the output node OUT. In addition, in operation S248c, an operation of connecting the first terminal T1 of the inductor L to the input node IN may be performed. For example, as illustrated in FIG. 9, the fourth switch SW4 may be coupled to the input node IN and the third node N3 and, by turning on the fourth switch SW4, the third node N3 may be connected to the input node IN. Therefore, the inductor current $I_L$ may flow from the ground node GND to the flying capacitor $C_F$ through the inductor L. Therefore, the inductor current $I_L$ may be greater than the inductor current $I_L$ obtained by operation S240b of FIG. 16B and the output voltage $V_{OUT}$ may be lower than the output voltage $V_{OUT}$ obtained by operation S240b of FIG. 16B.

Figure 17:
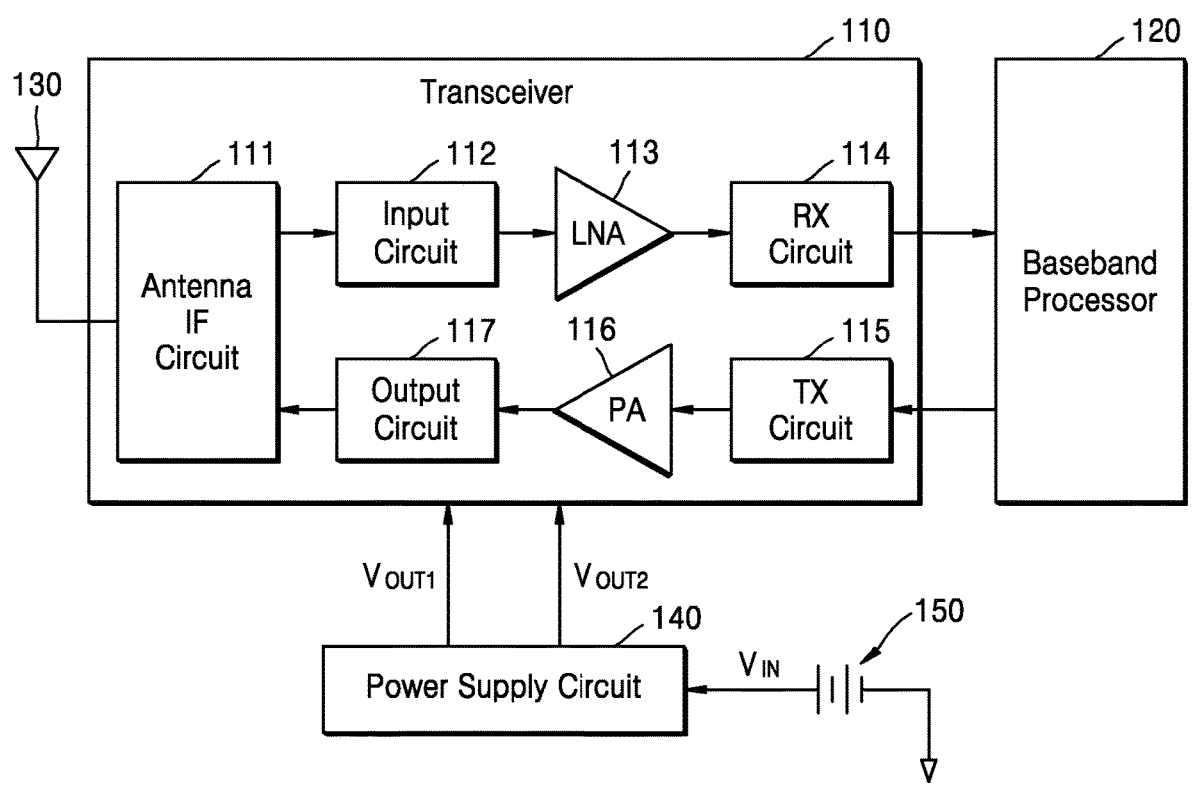
FIG. 17 is a block diagram illustrating a wireless communication device according to an embodiment.

FIG. 17 is a block diagram illustrating a wireless communication device 200 according to an embodiment. In detail, FIG. 17 illustrates user equipment (UE) (or a terminal) to which power is provided by a battery 150. In some embodiments, the wireless communication device 200 may be included in a wireless communication system in which a cellular network such as 5th generation (5G) or long-term evolution (LTE) is used or may be included in a wireless personal area network (WPAN) system or another wireless communication system. In the wireless communication device 200, the inverting switching regulator according to an embodiment may be used for providing a second output voltage $V_{OUT2}$ as a negative voltage to a transceiver 110. As illustrated in FIG. 17, the wireless communication device 200 may include the transceiver 110, a baseband processor 120, an antenna 130, a power supply circuit 140, and the battery 150.

The transceiver 110 may include an antenna interface (IF) circuit 111, a receiver including an input circuit 112, a low noise amplifier (LNA) 113, and a receiving (RX) circuit 114, and a transmitter including a transmitting (TX) circuit 115, a power amplifier (PA) 116, and an output circuit 117. The antenna interface circuit 111 may connect the transmitter or the receiver to the antenna 130 in accordance with a transmission mode or a reception mode. In some embodiments, the input circuit 112 may include a matching circuit or a filter, the low noise amplifier 113 may amplify an output signal of the input circuit 112, and the receiving circuit 114 may include a mixer for down-conversion. In some embodiments, the transmitting circuit 115 may include a mixer for up-conversion, the power amplifier 116 may amplify an output signal of the transmitting circuit 115, and the output circuit 117 may include a matching circuit or a filter.

The baseband processor 120 may transmit and receive baseband signals to and from the transceiver 110 and may perform modulation/demodulation, encoding/decoding, and channel estimation. In some embodiments, the baseband processor 120 may be referred to as a communication processor or a modem.

The power supply circuit 140 may receive the input voltage $V_{IN}$ from the battery 150 and may generate first and second output voltages $V_{OUT1}$ and $V_{OUT2}$ provided to the transceiver 110. For example, the power supply circuit 140 may include DC-DC converter in order to generate the first output voltage $V_{OUT1}$ that is a positive voltage from the input voltage $V_{1N}$ that is a positive voltage. In addition, the power supply circuit 140 may include the inverting switching regulator described above with reference to the drawings in order to generate the second output voltage $V_{OUT2}$ that is a negative voltage from the input voltage $V_{1N}$ that is a positive voltage. Therefore, the power supply circuit 140 may have high efficiency and a small area and may be integrated in the same die together with another component of the wireless communication device 200, for example, the transceiver 110.

While embodiments have been particularly shown and described with reference to embodiments thereof, it will be understood that various changes in form and details may be made therein without departing from the spirit and scope of the following claims.

What is claimed is:

1. An inverting switching regulator for generating a negative output voltage based on a positive input voltage, the inverting switching regulator comprising:
   an inductor configured to pass an inductor current from a first terminal to a second terminal;
   a flying capacitor coupled to the second terminal of the inductor;
   a load capacitor coupled to an output node to which the negative output voltage is output; and
   a plurality of switches configured to apply a negative voltage to the second terminal of the inductor by charging the flying capacitor by the positive input voltage during a first phase, and by connecting the flying capacitor in series to a ground node and the inductor during a second phase,
   wherein the plurality of switches comprise a first switch configured to directly connect the first terminal of the inductor to the output node during the first phase and a second switch configured to directly connect the first terminal of the inductor to the ground node during the second phase.

2. The inverting switching regulator of claim 1, wherein the inductor current flows to the ground node during the first phase and flows to the flying capacitor during the second phase.

3. The inverting switching regulator of claim 1, wherein the plurality of switches comprise a switch configured to provide the positive input voltage to the flying capacitor during the first phase and a switch configured to connect the flying capacitor to the ground node during the second phase.

4. The inverting switching regulator of claim 1, wherein the plurality of switches comprise a switch configured to connect the second terminal of the inductor to the ground node during the first phase and to disconnect the second terminal of the inductor from the ground node during the second phase.

5. The inverting switching regulator of claim 1, wherein the inductor current flows from the output node to the ground node through the inductor during the first phase and flows from the ground node to the flying capacitor through the inductor during the second phase in an inverting boost mode.

6. An inverting switching regulator for generating a negative output voltage based on a positive input voltage, the inverting switching regulator comprising:
   an inductor configured to pass an inductor current from a first terminal of the inductor to a second terminal of the inductor;
   a flying capacitor configured to be charged by the positive input voltage during a first phase and to cause a negative voltage in the second terminal of the inductor in accordance with stored charges during a second phase;
   a load capacitor coupled to an output node to which the negative output voltage is output; and
   a plurality of switches comprising a first switch and a second switch,
   wherein the first switch is configured to connect the first terminal of the inductor to the output node and to control the inductor current to flow from the output node to a ground node through the inductor during the first phase, and
   wherein the second switch is configured to apply the positive input voltage to the first terminal of the inductor to the ground node and to control the inductor current to flow from an input node, to which the positive input voltage is applied, to the flying capacitor during the second phase.

7. The inverting switching regulator of claim 6, wherein the plurality of switches are configured to:
   connect a first terminal of the flying capacitor to the input node to which the positive input voltage is applied during the first phase;
   connect the first terminal of the flying capacitor to the ground node during the second phase;
   connect a second terminal of the flying capacitor to the ground node during the first phase; and
   isolate the second terminal of the flying capacitor from the ground node and connect the second terminal of the flying capacitor to the second terminal of the inductor during the second phase.

8. The inverting switching regulator of claim 6, wherein the plurality of switches are configured to connect the second terminal of the inductor to the ground node during the first phase, and provide the negative voltage inverted from the positive input voltage when the second phase starts.

9. A method of providing a negative output voltage to an output node based on a positive input voltage, the method comprising:

charging a flying capacitor by the positive input voltage during a first phase;

steering an inductor current to sequentially flow from the output node through a first terminal of an inductor and a second terminal of the inductor to a ground node by directly connecting the first terminal of the inductor to the output node during the first phase;

applying a negative voltage to the second terminal of the inductor in accordance with stored charges of the flying capacitor during a second phase; and steering the inductor current to sequentially flow from the ground node through the first terminal of the inductor and the second terminal of the inductor to the flying capacitor by directly connecting the first terminal of the inductor to the ground node during the second phase.

10. The method of claim 9, wherein the charging of the flying capacitor by the positive input voltage during the first phase comprises:

connecting a first terminal of the flying capacitor to the ground node; and connecting a second terminal of the flying capacitor to an input node to which the positive input voltage is applied.

11. The method of claim 10, wherein the applying of the negative voltage to the second terminal of the inductor comprises:

disconnecting the first terminal of the flying capacitor from the ground node;

connecting the first terminal of the flying capacitor to the second terminal of the inductor; and connecting the second terminal of the flying capacitor to the ground node.

12. The method of claim 9, wherein the steering of the inductor current to flow to the flying capacitor comprises:

disconnecting the second terminal of the inductor from the ground node; and connecting the second terminal of the inductor to the flying capacitor.

* * * * *